United States Patent
Diab (10) Patent No.: US 8,412,850 B2
(45) Date of Patent: *Apr. 2, 2013

(54) SYSTEM AND METHOD FOR ADJUSTING A LEVEL OF COMPRESSION FOR COMPUTING CLIENTS

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,569

(22) Filed: Feb. 28, 2012

(65) Prior Publication Data

US 2012/0159000 A1    Jun. 21, 2012

Related U.S. Application Data

(63) Continuation of application No. 11/833,982, filed on Aug. 4, 2007, now Pat. No. 8,151,005.

(51) Int. Cl.
*G06F 15/16* (2006.01)
*G06F 11/00* (2006.01)

(52) U.S. Cl. .... 709/247; 709/232; 370/235; 348/E5.026

(58) Field of Classification Search .......... None
See application file for complete search history.

(56) References Cited

U.S. PATENT DOCUMENTS

| | | |
|---|---|---|
| 5,164,938 A | 11/1992 | Jurkevich et al. |
| 5,282,207 A | 1/1994 | Jurkevich et al. |
| 5,388,097 A | 2/1995 | Baugher et al. |
| 5,608,653 A | 3/1997 | Palmer et al. |
| 5,848,266 A | 12/1998 | Scheurich |
| 6,014,694 A * | 1/2000 | Aharoni et al. ............ 709/219 |
| 6,115,372 A | 9/2000 | Dinha |
| 6,212,200 B1 | 4/2001 | Iizuka et al. |
| 6,233,226 B1 | 5/2001 | Gringeri et al. |
| 6,385,673 B1 | 5/2002 | DeMoney |
| 6,618,363 B1 | 9/2003 | Bahl |
| 6,987,753 B2 | 1/2006 | Liu et al. |
| 7,031,259 B1 * | 4/2006 | Guttman et al. ............ 370/235 |
| 7,075,927 B2 | 7/2006 | Mo et al. |
| 7,394,815 B1 | 7/2008 | Suzuki |
| 7,466,652 B2 * | 12/2008 | Lau et al. ................ 370/230.1 |
| 7,583,683 B2 * | 9/2009 | Kim ......................... 370/401 |
| 7,602,723 B2 * | 10/2009 | Mandato et al. ............ 370/236 |
| 2001/0048670 A1 | 12/2001 | Kelly et al. |
| 2005/0120128 A1* | 6/2005 | Willes et al. ............... 709/232 |
| 2005/0169314 A1 | 8/2005 | Beaudoin et al. |
| 2007/0030833 A1 | 2/2007 | Pirzada et al. |
| 2008/0049787 A1 | 2/2008 | McNaughton et al. |
| 2008/0077702 A1 | 3/2008 | Posamentier |
| 2008/0101405 A1 | 5/2008 | Wirick et al. |
| 2009/0033739 A1 | 2/2009 | Sarkar et al. |
| 2009/0037606 A1 | 2/2009 | Diab |

(Continued)

OTHER PUBLICATIONS

Michael J. Teener, "Ethernet AV™ Summary," Apr. 2006.

(Continued)

*Primary Examiner* — Wen-Tai Lin
(74) *Attorney, Agent, or Firm* — Duane S. Kobayashi (57) ABSTRACT

A system and method for adjusting a level of compression for thin and chubby computing clients. End devices in a network can stream audio/video traffic over a network. Such a connection between the end devices can be reserved with guarantees of bandwidth and latency being obtained. Bandwidth guarantees across multiple intermediary switches can be used to define a compression level for the end devices. In one embodiment, the lowest compression level that will produce audio/video traffic that will fit in the guaranteed connection bandwidth is chosen to produce the highest quality audio/video stream.

18 Claims, 5 Drawing Sheets

U.S. PATENT DOCUMENTS

| | | |
|---|---|---|
| 2009/0041042 A1 | 2/2009 | Diab |
| 2009/0119736 A1 | 5/2009 | Perlman et al. |
| 2009/0122878 A1 | 5/2009 | Liu et al. |
| 2009/0213927 A1 | 8/2009 | Perlman et al. |
| 2009/0279550 A1 | 11/2009 | Romrell et al. |

OTHER PUBLICATIONS

Michael J. Teener, "AV Bridging and Ethernet AV™," Mar. 2007.

Foster et al., RFC 3661, Dec. 1, 2003.

* cited by examiner

SYSTEM AND METHOD FOR ADJUSTING A LEVEL OF COMPRESSION FOR COMPUTING CLIENTS

This application is a continuation of non-provisional patent application Ser. No. 11/833,982, filed Aug. 4, 2007, which is incorporated by reference herein, in its entirety, for all purposes.

BACKGROUND

1. Field of the Invention

The present invention relates generally to Ethernet networks and, more particularly, to a system and method for adjusting a level of compression for computing clients.

2. Introduction

Client-server applications typically involve numerous tradeoffs regarding the various levels of processing to be performed on the client and the server. This decision can greatly influence the relative cost of the clients and servers.

One type of client is a thin client. A thin client can be designed with relatively little processing power such that the bulk of the data processing occurs on the server. The thin client can therefore be designed to focus on conveying input and output between the user and the application. This framework can be used in a server-centric computing model. In contrast, a thick client can be designed with significant processing power. Here, the thick client can be responsible for much of the data processing, while the server is largely responsible for centralized storage and control.

In between the thin and thick client classifications there can exist various hybrid clients. These hybrid clients can exhibit both thin and thick client properties depending on the particular function of the client device. In many instances, a thin client can be turned into a "chubby" client through the inclusion of additional processing capacity for a particular application.

For example, consider a streaming video application where a video stream is transmitted from a server to a client. As would be appreciated, this transmission can occur in various wide area network (WAN), metropolitan area network (MAN), and local area network (LAN) contexts. Video streams require significant levels of bandwidth. This is especially true when considering the transport of high definition television (HDTV) signals. Owing to the increased resolution, an uncompressed 1080i HDTV video signal can take up to 1.4 Gbit/sec of bandwidth. Transport of an uncompressed full 1080p HDTV video signal would require even higher levels of bandwidth. As networks may not have the bandwidth capacity to support such HDTV signals, compression of the HDTV signals can be used. Addition of such compression circuitry and software could transform a thin client into a chubby client.

In a given network, various thin, chubby, and thick clients can exist and compete for limited transport bandwidth capacities. What is needed therefore is a mechanism for managing such a client devices in their efficient use of available network bandwidth.

SUMMARY

A system and/or method for adjusting a level of compression for computing clients, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet networks have become ubiquitous in their deployment across corporate and residential markets. In supporting high-bandwidth traffic, these Ethernet networks have benefited from the significant reduction in costs afforded by the growing economies of scale. Levels of network traffic are expected to increase, meaning that typical network connections will increasingly support 1000BASE-T, 10 GBASE-T and beyond. Typical network connections also include wireless network links as well.

Network resources are often limited in bandwidth as an increasing number of applications compete for the same network resources. By the very reach of Ethernet networks in supporting a greater number of data applications, the available bandwidth to a given device is often constrained. Some applications produce "bursty" traffic with high bandwidth, such as in the transfer of large files. Other applications involving audio/video (AV) traffic can produce a distributed stream of data. Regardless of the type of traffic and application, one of the ways of dealing with a bandwidth-limited situation is to use some form of compression to lower the amount of data that is transmitted over the network.

One problem with compression is identifying the appropriate level of compression that should be used. Clearly, compression of varying levels can be invoked for a particular data transfer. The greater the level of compression, however, the greater the level of sacrifice in the quality of transmitted data. Typically, the level of compression is chosen to meet some worst-case estimate of the available bandwidth. This often unnecessarily sacrifices the data due to the worst-case assumptions of the network. An alternative is to determine how much bandwidth is available to the devices at the time of transmission. Not only is this information difficult to obtain, but this information is also inaccurate when considering the dynamic changes in network capacity over the course of transmission.

It is a feature of the present invention that available compression levels can be chosen based on reliable indicators of available network bandwidth. Here, the usage of reliable indicators of available network bandwidth enable the devices to use only as much compression as is needed such that the resulting compressed traffic fits within the available network bandwidth.

In one embodiment, the available network bandwidth information is obtained upon application of a bandwidth reservation protocol. Here, the bandwidth reservation protocol is operative to reserve a level of bandwidth for the duration of a connection between devices. One example of such a bandwidth reservation protocol is AV bridging technology, which can be applied to AV streaming across the network. In general, AV bridging such as that described in IEEE 802.1 has been developed to reserve a connection with a certain quality of service (QoS). In this process, a bandwidth reservation protocol and a time synchronization protocol would be implemented to reserve a connection with guaranteed levels of bandwidth and latency. As would be appreciated, additional functionality such as encryption and compression can also be incorporated.

Latency, in particular, is a significant issue and would require the periodic exchange of timing information that would allow both ends of the link to synchronize their time-of-day clock precisely. In one embodiment, different granularities can be used to meet different traffic classes. For example, 125 µs periods (used in most current isochronous transports) can be used for low latency streams, while 1 ms periods can be used for moderate latency streams.

During link establishment, AV devices would exchange capability information. If the devices have the same network synchronization capability, the devices would then exchange configuration and clock synchronization information. Bridges between the devices would similarly be involved in the exchange of configuration and synchronization information. If all links in the connection between the devices can support network synchronization, then the connection having a certain QoS can be reserved. In contrast, if one of the links in the connection between the devices cannot support network synchronization, then the connection having a certain QoS cannot be reserved.

Figure 1:
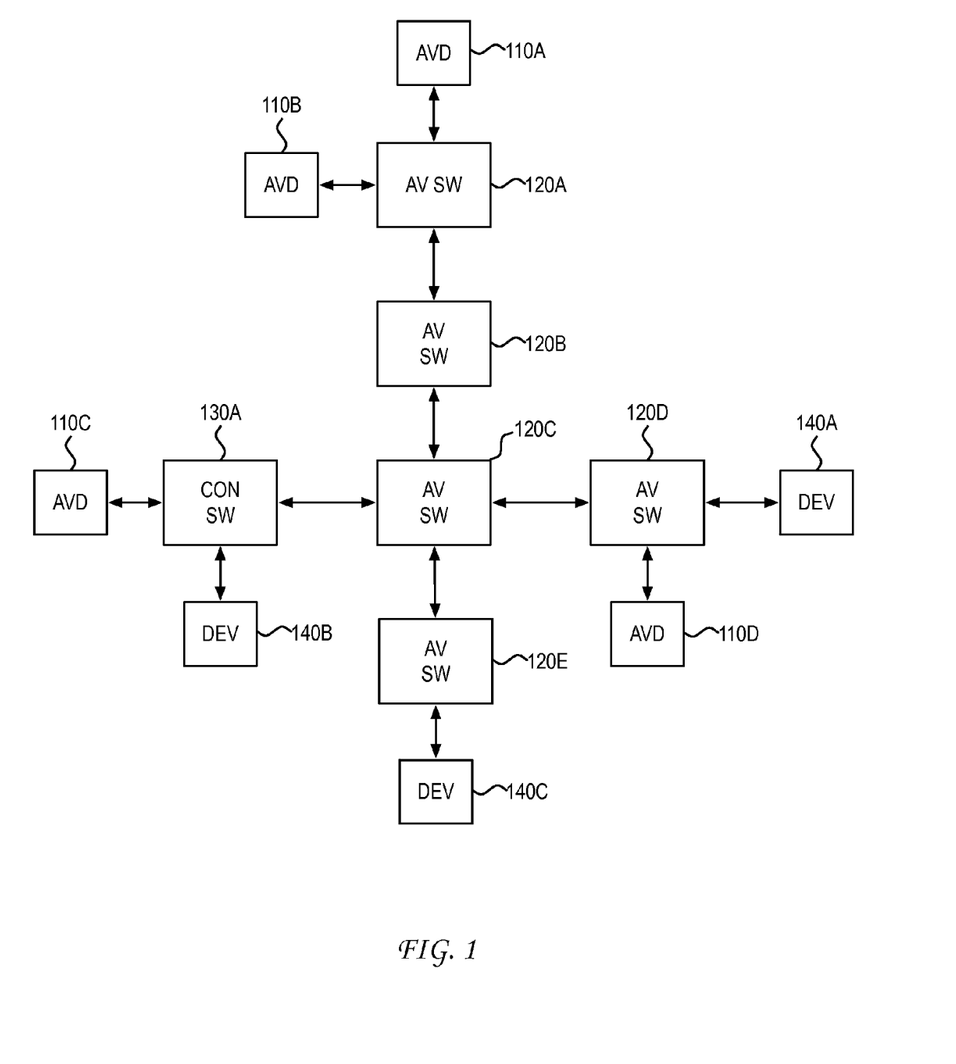
FIG. 1 illustrates an example of an Ethernet network that enables connectivity of client and server devices.

FIG. 1 illustrates an example of a network that supports connections between multiple devices. Two types of devices are shown in this example, AV devices (AVDs) 110A-110D and conventional Ethernet devices (DEVs) 140A-140C. Here, AVDs 110A-110D represent Ethernet devices that would support network synchronization, while DEVs 140A-140C represent Ethernet devices that would not support network synchronization. As illustrated, AVDs 110A-110D and DEVs 140A-140C are connected via various network switches. Two types of switches are shown in this example, AV switches (AV SWs) 120A-120D and conventional switch (CON SW) 130A. Here, AV SWs 120A-120E are switches that would support network synchronization, while CON SW 130A is a switch that would not support network synchronization.

As noted, a connection having a certain QoS can be reserved only if the devices and switches in the link all have network synchronization capability. If any of the devices or switches do not support the exchange of configuration and clock synchronization information, then only a non-guaranteed connection can be established.

With this framework, AVD 110A could establish a guaranteed QoS connection with AVD 110D, since AVDs 110A and 110D are supporting peer devices, and switches 120A-120D are supporting switches. In this connection setup process if the needed bandwidth is not available, then the amount of bandwidth that is available can be identified. In contrast, AVD 110A could not establish a guaranteed QoS connection with DEV 140A because DEV 140A is a non-supporting peer device. Also, AVD 110A could not establish a guaranteed QoS connection with AVD 110C because CON SW 130A is a non-supporting switch. For these latter two examples, only a non-guaranteed connection can be established.

It should be noted that the network arrangement of FIG. 1 can be applied to various residential and non-residential applications (e.g., AV studio). In these various applications, the AV switches need not be dedicated switches. Rather, the AV switches can be embodied in AV devices that have multiple Ethernet ports and switching functionality. For example, an AV device such as a computing device can be designed to function as both an AVD and as an AV SW. In general, any multi-port AV device (e.g., television, DVD player, set top box, gateway, media PC, etc.) can be used as a hub-like device in the network.

Figure 2:
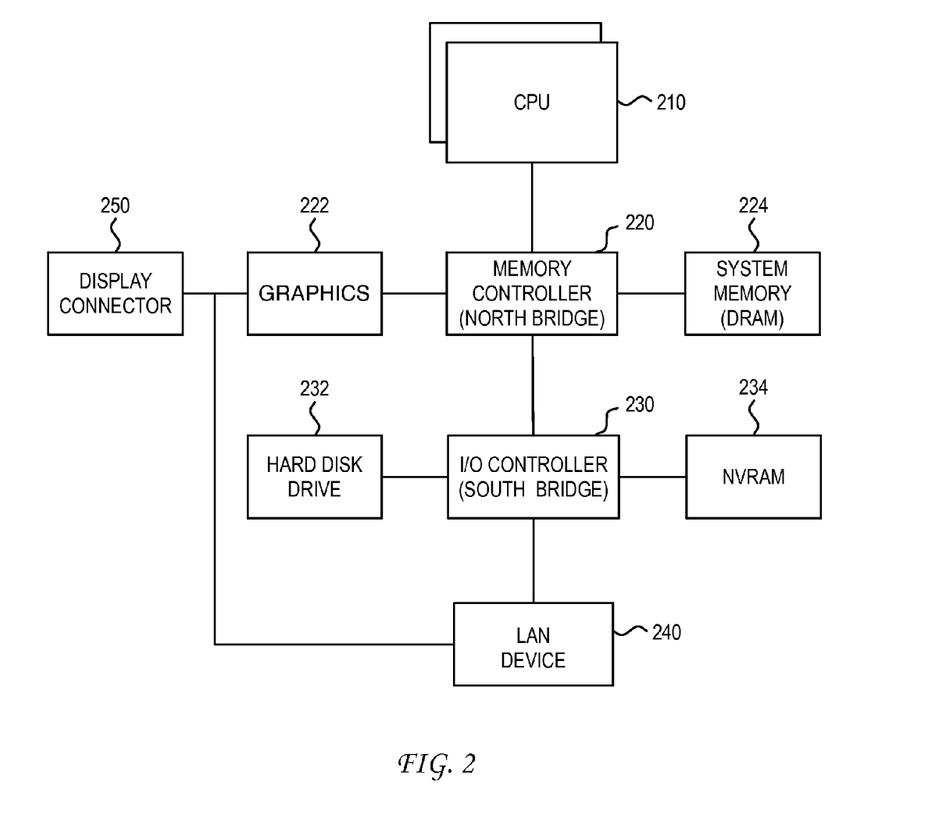
FIG. 2 illustrates an embodiment of a computing device.

FIG. 2 illustrates one embodiment of an AV computing device. In the illustration of FIG. 2, the AV device includes conventional computing components such as CPU(s) 210, memory controller (north bridge) 220, and I/O controller (south bridge) 230. As illustrated, memory controller 220 can be coupled to graphics subsystem 222 and main system memory 224. I/O controller 230, on the other hand, can also be coupled to various components, including hard disk drive 232 and nonvolatile RAM (NVRAM) 234.

As FIG. 2 further illustrates, I/O controller 230 is also in communication with LAN device 240. In general, LAN device 240 provides networking functionality such as that provided by a conventional network interface card (NIC). As LAN device 240 can be designed to support one or more Ethernet ports, LAN device 240 would include one or more media access controllers (MACs) (e.g., 100, 1G, 2.5G+), a PCI Express bus interface, on-chip buffer memory, and one or more integrated physical layer (PHY) transceivers.

As further illustrated, the AV computing device includes a display connector 250 (e.g., DisplayPort, HDMI, DVI, analog, etc.). Display connector 250 enables AV computing device to display video content (e.g., HDTV) or any other multimedia traffic on an external display device coupled to display connector 250. The video signal is also coupled to LAN device 240. Usage of such a display data path is described with reference to FIG. 3, which shows a detailed view of an embodiment of an example LAN device that is applied to DisplayPort signal processing. As would be appreciated, the principles of the present invention can be applied to native video or encapsulated HDMI, DisplayPort, DVI, etc. Encryption can also be used as needed by the particular implementation.

Figure 3:
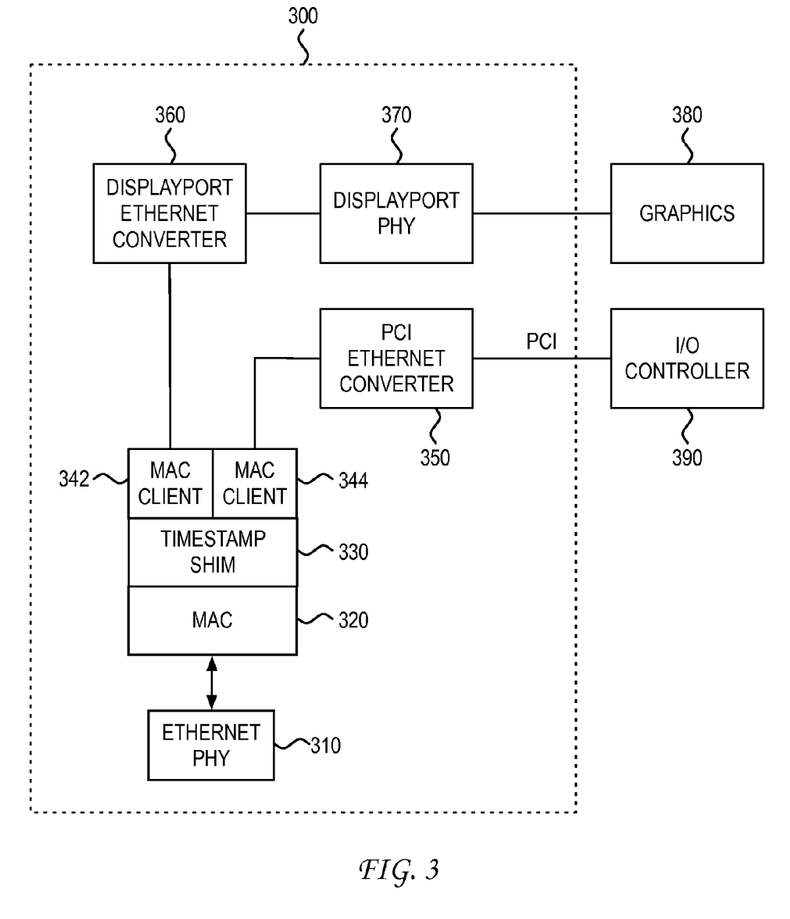
FIG. 3 illustrates an embodiment of a LAN device.

As illustrated in FIG. 3, LAN device 300 interfaces with graphics subsystem 380 and I/O controller 390. In interfacing with graphics subsystem 380, LAN device 300 includes DisplayPort/Ethernet converter 360 and DisplayPort PHY 370. If the AV computing device is operating as a server, then a DisplayPort signal generated by graphics subsystem 380 would be received at DisplayPort PHY 370, then converted to Ethernet via DisplayPort/Ethernet converter 360. The generated Ethernet signal could then be sent to a client via MAC 320 and PHY 310. If, on the other hand, the AV computing device is operating as a client, then an Ethernet signal would be received by PHY 310, and sent to MAC client 342 via MAC 320. The Ethernet signal would then be converted by DisplayPort/Ethernet converter 360 then passed on to graphics subsystem 380 via DisplayPort PHY 370.

As illustrated in FIG. 3, LAN device 300 also includes MAC client 344, which is coupled to I/O controller 390 via PCI/Ethernet converter 350. MAC client 344 represents an alternative path by which information is transmitted between the AV computing device and the Ethernet network. In one scenario, MAC client 344 can be used for less bandwidth or computationally intensive AV traffic that is streamed over the network.

As noted, the AV computing device can be used as an AVD or AV SW. When operating as an AVD, the AV computing device would rely on timestamp shim 330 and a traffic classifier and scheduler in the MAC client. When operating as an AV SW, the AV computing device would contain multiple MACs and PHYs, while also including admission controller, frame filtering/routing, and time synchronization services. Additional details of such services are exemplified by IEEE 802.1AS, which provides a time synchronization protocol; IEEE 802.1 Qat, which provides a stream reservation protocol; and IEEE 802.1 Qav, which provides for guaranteed latency and bandwidth for established streams.

As would be appreciated, the example embodiments of FIGS. 2 and 3 are not intended to be exhaustive or limiting. Various other memory controller and I/O controller configurations can be used with the principles of the present invention. In supporting guaranteed QoS connections, however, it is significant that the AVD identifies a bandwidth level as part of the reservation process. It is a feature of the present invention that this identified level of bandwidth can be used in determining how best to use the bandwidth capacity that has been reserved. As will be described in greater detail below, knowledge of the available bandwidth capacity would enable devices to choose a lower amount of compression even if the devices are capable of higher levels of compression.

In conventional systems, servers do not have a priori knowledge of the bandwidth that will be available for streaming of data. This results since typical network usage is contention based as multiple devices contend for fixed network resources. In assessing the network, the server would often assume a typical connection. Where the nature of the streaming traffic dictates that delivery guarantees are needed, the server must then assume a worst-case connection and transmit in accordance with that assumption. Reliance on worst-case assumptions typically result in less than optimal performance.

For example, if the end devices assume a worst-case connection bandwidth, the end devices may need to assume that the best-case compression should be used. Not only would this best-case compression result in the worst-case quality of the streamed traffic, but the available bandwidth would also not be efficiently utilized. This represents poor network utilization.

In accordance with the present invention, bandwidth reservation information is used to determine how best to leverage available network resources through the selective utilization of computing resources in thin, chubby, or thick clients. To illustrate this impact, reference is now made to the flowchart of FIG. 4. As illustrated, the process begins at step 402, where a level of compression is chosen for a particular stream of data. At step 404, the level of bandwidth needed to accommodate the level of compression of the stream of data would then be identified. Next, at step 406, the identified level of bandwidth is requested between the client and server. In one embodiment, the bandwidth reservation is made through one or more bridges/switches in accordance with AV bridging technology such as that described above. As the reserved bandwidth is preserved until the connection is released, the end devices are assured that the reserved bandwidth level will persist throughout the lifetime of the connection.

Figure 4:
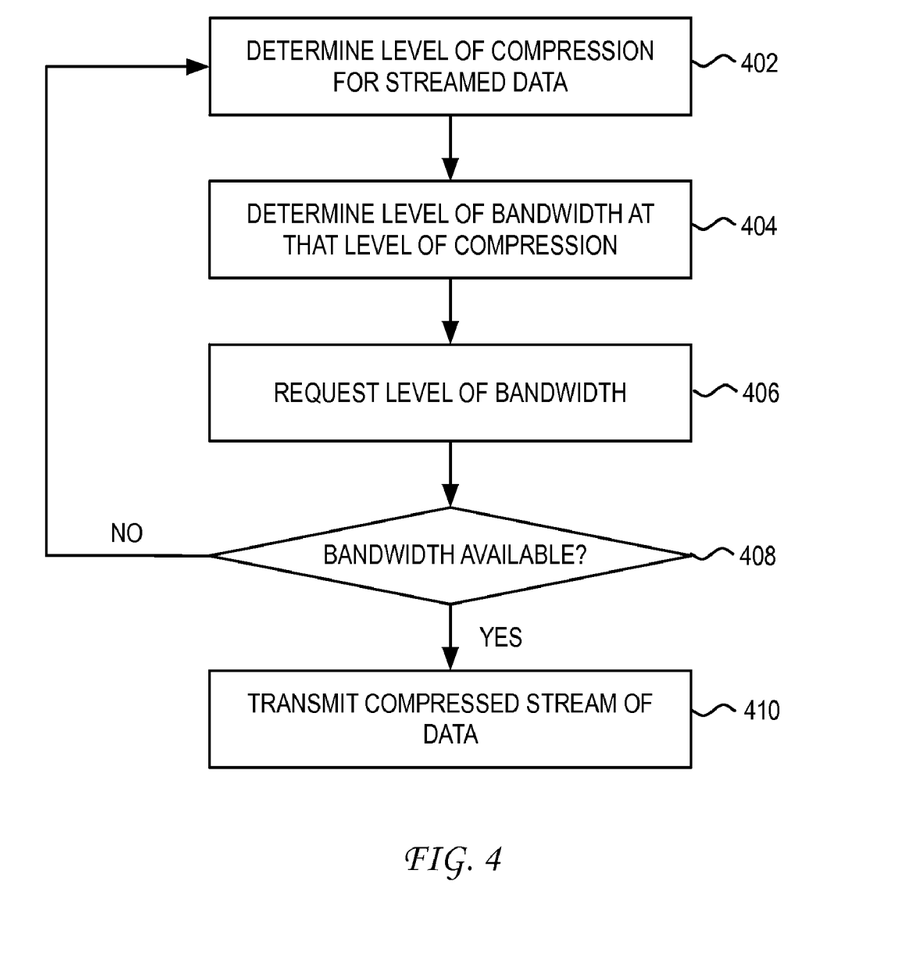
FIGS. 4 and 5 illustrate flowcharts of processes of compressing a stream of data.

For example, assume that a chosen level of compression dictates that 40 Mbit/s of bandwidth is required. The devices would then request to reserve 40 Mbit/s of bandwidth through the one or more bridges/switches.

At step 408, it is then determined whether the requested level of bandwidth is available between the client and server. If the requested level of bandwidth is available, then the process would continue to step 410 where the compressed streamed data is transmitted over the reserved connection. In various embodiments, this compression can be effected in hardware or software.

If, on the other hand, the requested level of bandwidth is not available, then the process would loop back to step 402, where a new level of compression is determined. In this process, a higher level of compression can be selected, such that the bandwidth required is reduced. For example, assume that five compression levels are available to the end devices, with the highest rate of compression representing level 5 and the lowest rate of compression representing level 1. The end devices could initially choose compression level 3, which produces a stream of 40 Mbit/s. If the request for 40 Mbit/s is denied, then the end devices could examine higher rates of compression (i.e., levels 4 or 5). The bandwidth needed for that new level of compression would then be requested. This process would continue until the lowest bandwidth level produced by a chosen compression level would be approved in the bandwidth reservation process. In one embodiment, the application can be notified upon a denial at step 408, whereupon a user can choose to operate at the maximum compression level or terminate the connection.

Figure 5:
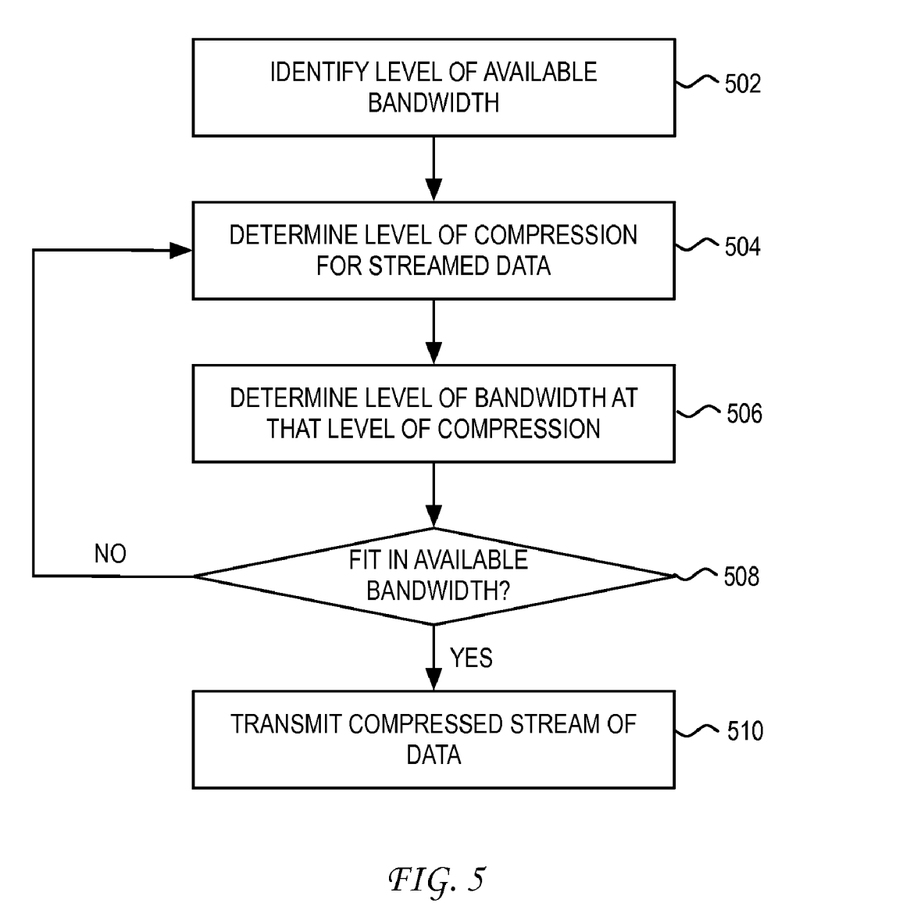

FIG. 5 illustrates another example of a process of compressing streamed data. As illustrated, the process begins at step 502 where a level of available bandwidth is identified. After the level of available bandwidth is identified, a level of compression is chosen for a particular stream of data at step 504. In one embodiment, the initial choice is a low or lowest level of compression (or even no compression). Next, at step 506, the level of bandwidth produced by the chosen level of compression is identified. At step 508, it is then determined whether the identified level of bandwidth would fit in the amount of bandwidth that is available.

If it is determined that the level of bandwidth would fit in the available bandwidth, then the compressed stream of data is transmitted at step 510. Here, it is assumed that a low level of compression (or no compression) is chosen such that an unnecessary amount of compression is not used. If, on the other hand, it is determined at step 508 that the level of bandwidth would not fit in the available bandwidth, then a higher compression level must be used. The process then loops back to select a higher compression level at step 504.

In one embodiment, the initial choice of the level of compression is a high or highest level of compression. In this embodiment, the iterative process would continue to select lower and lower levels of compression until the lowest level of compression is identified that would produce a stream of data that would fit in the available bandwidth.

As has been described, the adjustment of the level of compression can be chosen based on the available bandwidth identified using a bandwidth reservation protocol. In various embodiments, this bandwidth reservation protocol can be static or dynamic. With a dynamic bandwidth reservation protocol, changes in the guaranteed connection could occur midstream. In this case, the end devices could also be designed to adjust the compression level dynamically.

It should also be noted that while the present invention has been described in the context of wired networks, the principles of the present invention would also apply to wireless networks. Additionally, the principles of the present invention can be applied to any network carrying traffic that can be streamed and/or compressed. For example, the principles of the present invention can be applied to a low bandwidth network carrying audio traffic, a lower bandwidth wireless network carrying lower bandwidth video, etc.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A network communication method, comprising:
   prior to a transport of audio/video data from a first device to a second device, reserving a level of bandwidth for said transport for a duration of an entire communication session established over one or more Ethernet links between said first device and said second device so that said level of bandwidth guaranteed, said reservation being performed across one or more bridge devices between said first device and said second device using a time synchronization protocol that exchanges timing information that enables synchronization of a first clock in said first device with a second clock in said second device;
   prior to an initiation of said transport of said audio/video data, determining a level of compression for said audio/video data based on said reserved level of bandwidth for said duration of said entire communication session;
   compressing said audio/video data at said determined level of compression; and
   transmitting said compressed audio/video data from said first device to said second device.

2. The method of claim 1, wherein said determining comprises determining a minimum level of compression that would enable said audio/video data to fit in said reserved level of bandwidth.

3. The method of claim 1, wherein said audio/video data includes data from a high definition television signal.

4. The method of claim 1, wherein said second device is a television.

5. The method of claim 1, wherein said second device is a computing device.

6. The method of claim 1, wherein said compressing comprises compressing using a graphics subsystem.

7. The method of claim 1, wherein said compressing comprises compressing using a processor.

8. A network device, comprising:
   a controller that is configured to generate a request to reserve a level of bandwidth for a duration of an entire communication session carried over one or more Ethernet links between the network device and a receiving device so that said level of bandwidth is guaranteed, said reservation being performed across one or more bridge devices between the network device and said receiving device using a time synchronization protocol that exchanges timing information, which enables synchronization of a first clock in the network device with a second clock in said receiving device; and
   a compression module designed to compress data for transmission over said Ethernet connection between the network device and said receiving device, said compression module being configured to identify a compression level that enables said compressed data produced by said compression module to fit within a level of bandwidth that has been reserved for said duration of said entire communication session carried over said one or more Ethernet links between the network device and said receiving device.

9. The network device of claim 8, wherein said data includes audio/video data.

10. The network device of claim 8, wherein said data includes data from a high definition television signal.

11. The network device of claim 8, wherein said compression module is a graphics subsystem.

12. The network device of claim 8, wherein said compression module is a processor.

13. A network communication method, comprising:
   prior to a transport of audio/video data, requesting a reservation of a level of bandwidth for a duration of an entire communication session established over one or more Ethernet links between a first device and a second device so that said level of bandwidth is guaranteed, said reservation being performed across one or more bridge devices between said first device and said second device using a time synchronization protocol that exchanges timing information that enables synchronization of a first clock in said first device with a second clock in said second device;
   prior to said transport of said audio/video data, determining a level of compression for said audio/video data, said determined level of compression being designed to fit within a level of bandwidth that has been reserved for said duration of said entire communication session over said one or more bridge devices;
   compressing said audio/video data at said determined level of compression; and
   transmitting said compressed audio/video data from said first device to said second device via said one or more bridge devices.

14. The method of claim 13, wherein said audio/video data includes data from a high definition television signal.

15. The method of claim 13, wherein said second device is a television.

16. The method of claim 13, wherein said second device is a computing device.

17. The method of claim 13, wherein said compressing comprises compressing using a graphics subsystem.

18. The method of claim 13, wherein said compressing comprises compressing using a processor.

* * * * *